(12) United States Patent
Creedon et al.

(10) Patent No.: US 11,948,050 B2
(45) Date of Patent: Apr. 2, 2024

(54) CACHING OF MACHINE LEARNING MODEL TRAINING PARAMETERS

(71) Applicant: EMC IP Holding Company LLC, Hopkinton, MA (US)

(72) Inventors: Sean Creedon, Ballincollig (IE); Ian Gerard Roche, Glanmire (IE)

(73) Assignee: EMC IP Holding Company LLC, Hopkinton, MA (US)

( * ) Notice: Subject to any disclaimer, the term of this patent is extended or adjusted under 35 U.S.C. 154(b) by 597 days.

(21) Appl. No.: 16/794,740

(22) Filed: Feb. 19, 2020

(65) Prior Publication Data

US 2021/0256418 A1 Aug. 19, 2021

(51) Int. Cl.
*G06N 20/00* (2019.01)
*G06F 9/455* (2018.01)
*G06F 12/0871* (2016.01)
*G06N 3/08* (2023.01)

(52) U.S. Cl.
CPC ......... *G06N 20/00* (2019.01); *G06F 9/45558* (2013.01); *G06F 12/0871* (2013.01); *G06N 3/08* (2013.01); *G06F 2009/45583* (2013.01); *G06F 2009/45595* (2013.01)

(58) Field of Classification Search
CPC ........ G06N 20/00; G06N 20/10; G06N 20/20; G06N 3/08; G06N 3/082; G06N 3/084; G06N 3/086; G06N 3/088
USPC ....................................................... 706/12–44
See application file for complete search history.

(56) References Cited

U.S. PATENT DOCUMENTS

| 8,768,870 B1 * | 7/2014 | Corrado | G06N 7/08 706/12 |
| 2015/0379430 A1 * | 12/2015 | Dirac | G06N 20/00 706/12 |
| 2020/0151613 A1 * | 5/2020 | Yoo | G06F 11/3466 |

(Continued)

FOREIGN PATENT DOCUMENTS

WO WO-2016004075 A1 * 1/2016 ............ G06F 9/5066

OTHER PUBLICATIONS

Https://en.wikipedia.org/wiki/Deep_learning, downloaded on Feb. 13, 2020.

(Continued)

*Primary Examiner* — Ilwoo Park
(74) *Attorney, Agent, or Firm* — Ryan, Mason & Lewis, LLP

(57) ABSTRACT

Techniques are provided for caching of machine learning model training parameters. One method comprises training a machine learning model using a given training dataset; and caching a parameter of the machine learning model from the training with the given training dataset. The cached parameter of the machine learning model is used for a subsequent training of the machine learning model. The caching may be performed after each of multiple iterations of the training of the machine learning model. A given cached iteration of the training of the machine learning model may be identified using a key based on: (i) a hash of the given training dataset, (ii) a hash of the machine learning model parameter, and/or (iii) hyperparameters of the machine learning model. The caching of a given iteration of the machine learning model may occur when the given cached iteration is not found in a cache memory.

20 Claims, 8 Drawing Sheets

(56) References Cited

U.S. PATENT DOCUMENTS

2020/0334524 A1* 10/2020 Sprague .................. H04L 67/12
2021/0058415 A1* 2/2021 Sanzgiri .............. H04L 63/1433

OTHER PUBLICATIONS

Https://www.tensorflow.org/datasets/catalog/overview, downloaded on Feb. 13, 2020.
Https://www.kaggle.com/learn/deep-learning, downloaded on Feb. 13, 2020.
Https://www.tensorflow.org/, downloaded on Feb. 13, 2020.
Https://keras.io, downloaded on Feb. 13, 2020.
Https://pytorch.org, downloaded on Feb. 13, 2020.
Https://caffe.berkeleyvision.org, downloaded on Feb. 13, 2020.
Https://mxnet.apache.org, downloaded on Feb. 13, 2020.
Https://deeplearning4j.org/, downloaded on Feb. 13, 2020.
Https://en.wikipedia.org/wiki/Inceptionv3, downloaded on Feb. 13, 2020.
Https://github.com/tensorflow/models/tree/master/official/nlp/bert, downloaded on Feb. 13, 2020.
Https://github.com/tensorflow/models/tree/master/official/transformer, downloaded on Feb. 13, 2020.
Https://github.com/tensorflow/models/tree/master/official/nlp/xlnet, downloaded on Feb. 13, 2020.
Https://github.com/tensorflow/models/tree/master/official/vision/image_classification, downloaded on Feb. 13, 2020.
Https://github.com/tensorflow/models/tree/master/official/vision/detection, downloaded on Feb. 13, 2020.
"What is Data Labeling for Machine Learning?"; https://aws.amazon.com/sagemaker/data-labeling/what-is-data-labeling/; downloaded on May 1, 2023.
"What is the Difference Between Labelled and Unlabelled Data?"; https://livebook.manning.com/book/grokking-machine-learning/2-1-what-is-the-difference-between-labelled-and-unlabelled-data-/v-4/36; downloaded on May 1, 2023.
"What is Data Labeling?"; https://www.ibm.com/topics/data-labeling; downloaded on May 1, 2023.
"The Ultimate Guide to Data Labeling for Machine Learning"; https://www.cloudfactory.com/data-labeling-guide; downloaded on May 1, 2023.

* cited by examiner

CACHING OF MACHINE LEARNING MODEL TRAINING PARAMETERS

FIELD

The field relates generally to information processing, and more particularly to machine learning techniques.

BACKGROUND

Machine learning techniques typically employ models and algorithms to perform many different types of tasks based on patterns and inferences that were learned during a training phase. In a number of contexts, the same training data and machine learning models are repeatedly leveraged across a number of users. Education courses in the area of machine learning, for example, often use the same machine learning models and sample data to step many users through the educational materials. In addition, the users are often asked to expand their learning by experimenting with the same machine learning models by changing some parameters, often following the same scripts within the bounds of some finite limit of permutations. The TensorFlow dataset collections, for example, are often used in connection with the TensorFlow software library platform to implement machine learning and deep learning systems (e.g., for education and experimentation), while students learn about machine learning (particularly, in the area of neural networks).

A need exists for improved techniques for more efficient training of such machine learning models.

SUMMARY

In one embodiment, a method comprises training a machine learning model using a given training dataset; and caching at least one parameter of the machine learning model from the training with the given training dataset, wherein the cached at least one parameter of the machine learning model is used for a subsequent training of the machine learning model.

In some embodiments, the caching is performed after each of a plurality of iterations of the training of the machine learning model. A given cached iteration of the training of the machine learning model may be identified, for example, using a key based at least in part on one or more of: (i) a hash of the given training dataset, (ii) a hash of the at least one parameter of the machine learning model following the given cached iteration, and (iii) one or more hyperparameters of the machine learning model following the given cached iteration. The key for the given cached iteration of the training of the machine learning model may be evaluated to determine if the given cached iteration is in a cache memory.

In one or more embodiments, a given cached iteration of the training of the machine learning model comprises the trained machine learning model following the given cached iteration, checkpoints of the given cached iteration, and a response time of the given cached iteration. The caching of a given iteration of the training of the machine learning model occurs in at least some embodiments when the given cached iteration is not found in a cache memory.

Other illustrative embodiments include, without limitation, apparatus, systems, methods and computer program products comprising processor-readable storage media.

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for caching of machine learning model training parameters.

As noted above, in a number of contexts, the same training data and machine learning models are repeatedly leveraged across a number of users. The training of the same machine learning models with the same training data is often referred to as redundant model retraining. In addition, the training of the such machine learning models typically employs graphical processing units (GPUs) and is considered to be computationally expensive, while also consuming a significant amount of time. Contention for such GPUs is often a problem at peak times. Kaggle Competitions are another example where redundant training of the same machine learning models occurs because the same dataset is shared by a number of competitors.

One or more aspects of the present disclosure recognize that a need remains for reducing redundant training of machine learning models, as conventional techniques discard training results after execution by a processing and management layer. In one or more embodiments, techniques are provided for caching of one or more machine learning model training parameters, so that they can be reused for a subsequent training of the machine learning model. In some embodiments, the caching is performed after each iteration of the machine learning model training.

GPUs are often used to perform calculations with deep learning networks and other machine learning implementations, as GPUs were developed to handle large numbers of parallel computations using thousands of processing cores. In addition, GPUs have a large memory bandwidth to deal with the data for these computations. Batches of computation work can be distributed across multiple GPUs in parallel, as discussed further below in conjunction with FIGS. 2 and 4, and the results are then combined. GPUs can be accessed, for example, using local machines, data centers dedicated to data science teams, as well as virtual GPU (vGPU) implementations, such as GPU-as-a-Service environments.

As used herein, the term "machine learning model" and other similar terms shall encompass machine learning models, deep learning networks, neural networks and other artificial intelligence models.

Figure 1:
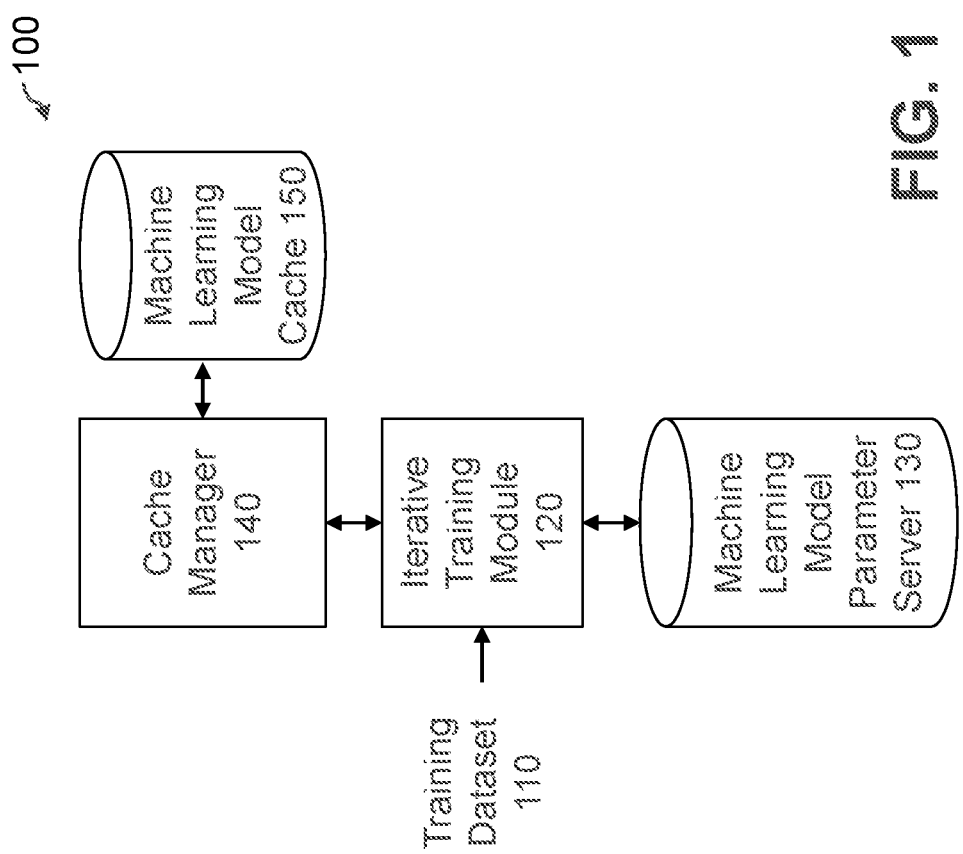
FIG. 1 illustrates an exemplary training of a machine learning model, according to one or more embodiments.

FIG. 1 illustrates an exemplary training 100 of a machine learning model, according to one or more embodiments. As shown in FIG. 1, an iterative training module 120 processes a training dataset 110 to train the machine learning model. One or more parameters of the machine learning model are stored in a machine learning model parameter server 130, as discussed further below.

In addition, in one or more embodiments, a cache manager 140 coordinates the caching of one or more parameters of the machine learning model being trained in a machine learning model cache 150 using the disclosed machine learning model training parameter caching techniques, as discussed further below. In at least some embodiments, the exemplary machine learning model cache 150 is using a non-volatile memory, for example, accessible to multiple applications.

Figure 2:
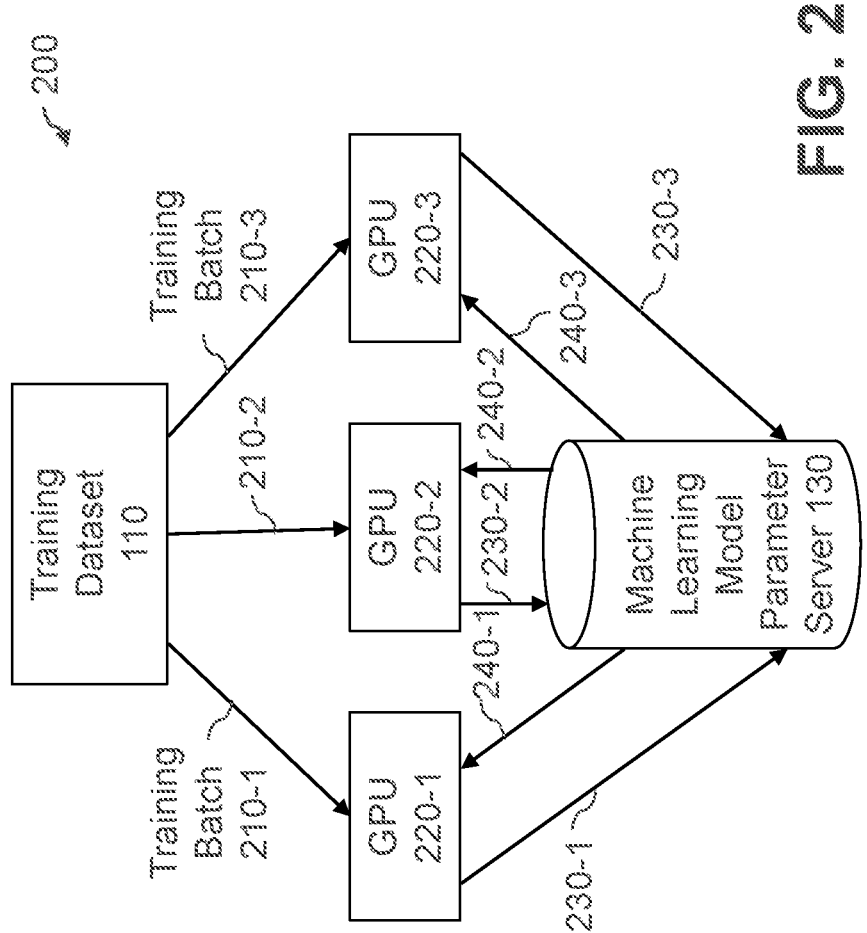
FIG. 2 illustrates an exemplary training of a machine learning model using the training dataset of FIG. 1 in further detail, according to some embodiments of the disclosure.

FIG. 2 illustrates an exemplary training 200 of the machine learning model using the training dataset 110 of FIG. 1 in further detail, according to some embodiments of the disclosure. The exemplary machine learning model classifies objects and executes on a number of parallel GPUs 220-1 through 220-3. As shown in FIG. 2, the training dataset 110 is applied to the parallel GPUs 220, for example, as respective batches 210-1 through 210-3 of the training dataset 110, in a known manner.

For an exemplary image classifier implementation, the exemplary training dataset 110 comprises, for example, multiple images of various objects, each labeled with the corresponding name of the object (e.g., as provided by a human analyst). During the training 200, the machine learning model learns to recognize the name of each object. The learned parameters of the machine learning model are stored in the machine learning model parameter server 130 of FIG. 1.

For example, gradients 230-1 through 230-3 are really the result of computation for each node in the DNN (as discussed further below in conjunction with FIG. 3). The gradients 230 reside in the machine learning model cache 150 of FIG. 1 when the gradients 230 are saved as part of a checkpoint (e.g., at the end of an epoch). In some embodiments, the machine learning model parameter server 130 of FIG. 1 comprises different sets of machine learning model parameters 240-1 through 240-3 that are passed at the launch of a training process and get saved in the machine learning model parameter server 130 with a link to the machine learning model cache 150 that these stored parameters 240 relate to. For a new training request, the machine learning model parameter server 130 is scanned and if a hit is found then the cached model is returned (e.g., with simulated response times), as discussed further below.

Figure 3:
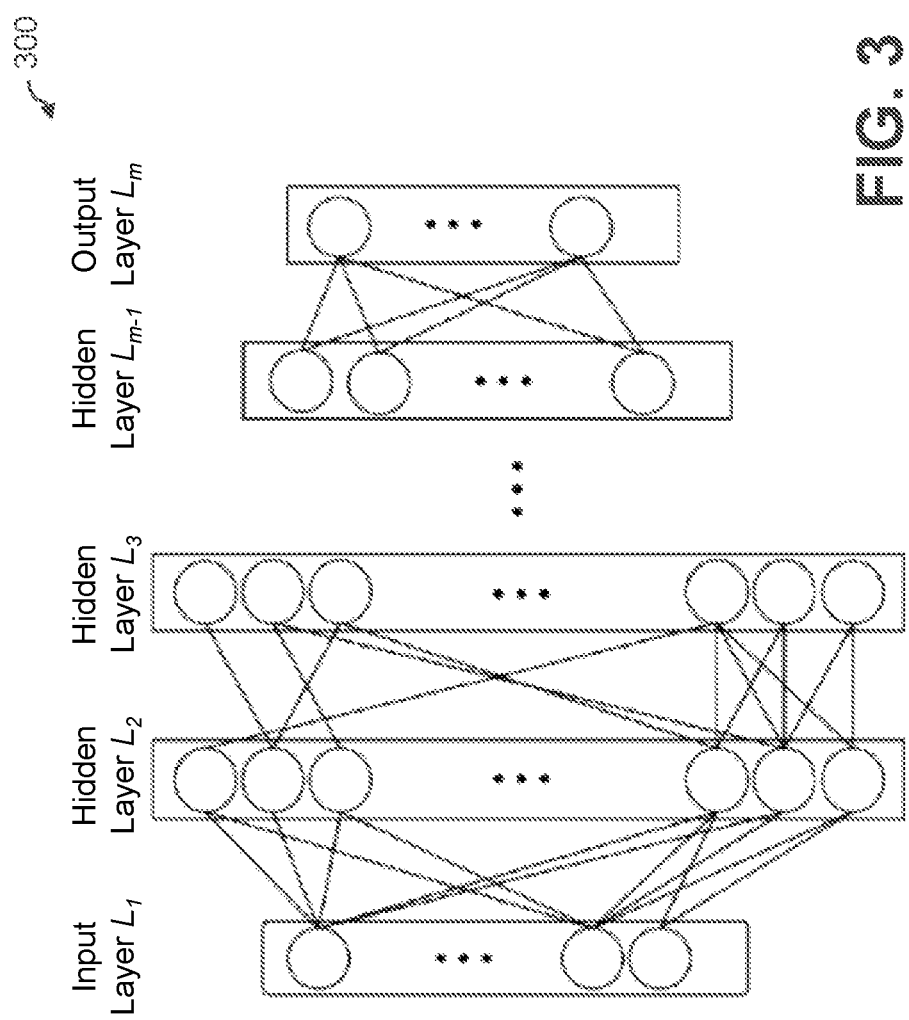
FIG. 3 illustrates an exemplary trained machine learning model, according to one or more embodiments of the disclosure.

FIG. 3 illustrates an exemplary trained machine learning model 300, according to one or more embodiments of the disclosure. As shown in FIG. 3, the exemplary trained machine learning model 300 comprises an input layer $L_1$, one or more input layers $L_2$ through $L_{m-1}$ and an output layer $L_m$, in a known manner. For an exemplary DNN implementation of the trained machine learning model 300 of FIG. 3, the trained machine learning model 300 may comprise, for example, a model design specification, hyperparameters and the model parameters, as discussed hereinafter.

Figure 4:
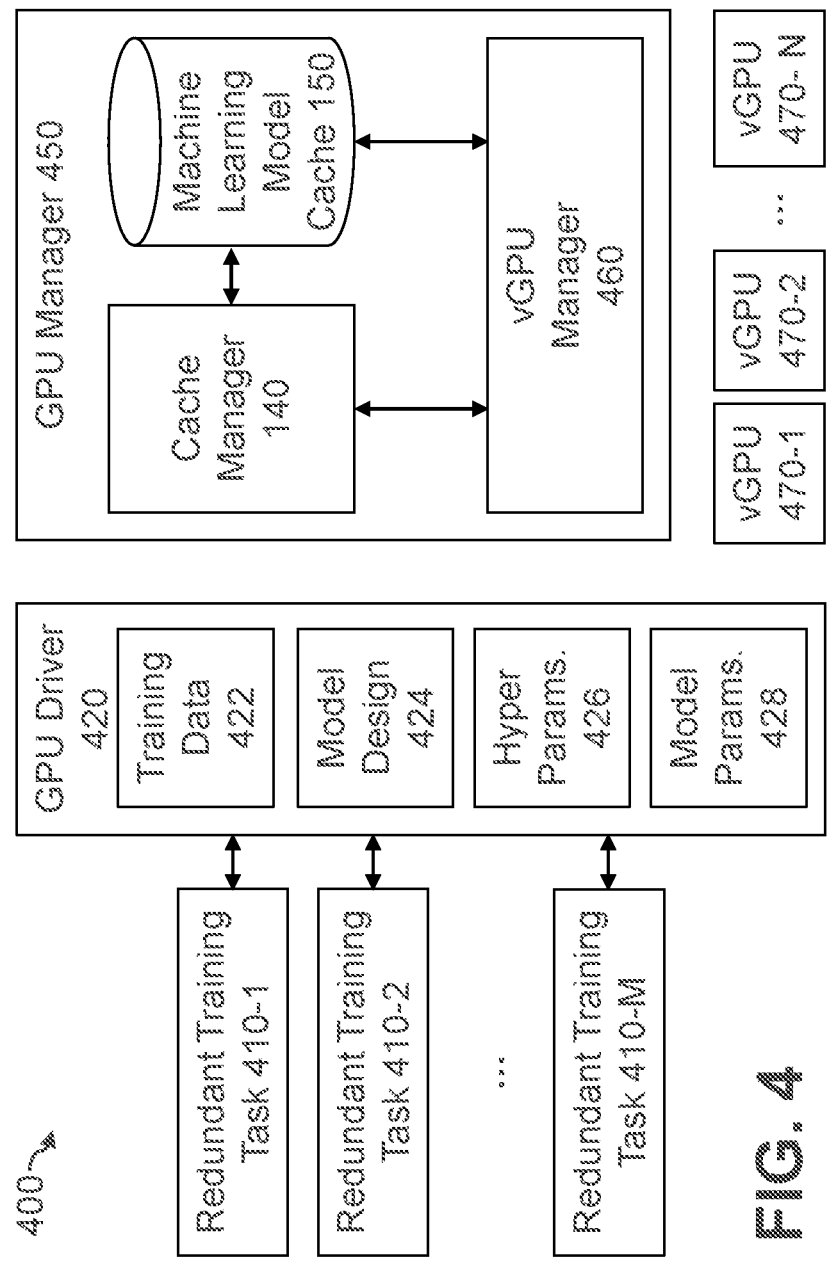
FIG. 4 illustrates an exemplary deep neural network (DNN) processing environment that executes the training process to train a machine learning model, according to some embodiments.

FIG. 4 illustrates an exemplary DNN processing environment 400 that executes the training process to train a machine learning model, according to some embodiments of the disclosure. As shown in FIG. 4, a plurality of redundant training tasks 410-1 through 410-M, such as different students often using the same machine learning models and sample data to step through educational materials, are processed by a GPU driver 420. Generally, the GPU driver 420 is used to allow a computer program to communicate with the GPU hardware and use the GPU hardware to do processing.

As shown in FIG. 4, the exemplary GPU driver 420 processes training data 422, a model design 424, hyperparameters 426 and model parameters 428. As noted above, for an exemplary image classifier implementation, the exemplary training data 422 comprises, for example, multiple images of various objects, each labeled with the corresponding name of the object (e.g., as provided by a human analyst). During the training of the machine learning model, the machine learning model uses the training data 422 to learn to recognize the name of each object.

In an exemplary DNN implementation of the trained machine learning model 300 of FIG. 3, the model design 424 specification comprises, for example, one or more of: a weight initialization (such as a random or uniform distribution), an activation function (such as a non-linear ReLU (Rectified Linear Unit) activation function), a loss value indicating a penalty for a bad prediction, a number of hidden layers (see, e.g., FIG. 3), a number of units per layer, an optimizer, an optimization technique (such as a Stochastic Gradient Descent (SGD)), and a dropout layer (e.g., dropout is a technique for preventing a model from overfitting, by setting the outgoing edges of hidden units to zero at each update of the training phase).

The exemplary hyperparameters 426 comprise, for example, a learning rate, a dropout rate (e.g., a probability of training a given node in a layer, where 1.0 typically means no dropout, and zero means no outputs from the layer), and a batch size (typically, the number of training examples utilized in one iteration or epoch).

The model parameters 428 comprise, for example, weights of node-to-node connections across layers of the neural network (e.g., indicating the architecture of the machine learning model).

As shown in FIG. 4, a GPU manager 450 manages and monitors GPUs (such as vGPUs 470-1 through 470-N, via a vGPU manager 460) in cluster environments. The GPU manager 450 often includes health monitoring, comprehensive diagnostics, system alerts and/or governance policies, such as power and clock management policies. The exemplary GPU manager 450 comprises the disclosed cache manager 140 that coordinates the caching of one or more parameters of the machine learning model being trained in the machine learning model cache 150 using the disclosed machine learning model training parameter caching techniques, as discussed herein.

In some embodiments, the exemplary GPU manager 450 triggers a checkpoint of one or more parameters of the machine learning model for a given epoch or iteration if the submitted training task is not already in the machine learning model cache 150.

The exemplary GPU manager 450 accesses the machine learning model cache 150 to determine if the machine learning model cache 150 already contains a checkpoint of the machine learning model parameters of a submitted training task (often referred to as a cache hit when the parameters are in the machine learning model cache 150, and a cache miss when the parameters are not in the machine learning model cache 150). In the event of a cache miss, the GPU manager 450 will coordinate with the vGPU manager 460 to perform a checkpoint operation and to store the checkpoint in the machine learning model cache 150.

In one or more embodiments, the disclosed techniques for caching the machine learning model training parameters reduces redundant retaining and GPU usage, by introducing a cache optimization at the GPU driver 420 and vGPU manager 460 layer during the training of deep neural networks and other machine learning models.

In at least some embodiments, the disclosed techniques for caching machine learning model training parameters are implemented both at the GPU driver 420 and the vGPU manager 460 layer in order to cover situations where a shared physical GPU laboratory, for example, is used without virtual machine implementations of the GPUs. In this manner, a virtual GPU Driver and manager layer can be used to allow multiple computer programs running on different virtual servers to communicate with shared GPU hardware and use the shared GPU hardware for processing.

In some embodiments, the key is used to check if the trained machine learning model parameters are already available in the machine learning model cache 150 and thereby bypass the GPU execution of the resubmitted training phase and rather, provide a simulated training response to the user.

The disclosed cache design can be considered a pull through mechanism in at least some embodiments, as the ratio of cached data relative to processing to generate the data is small (if the training data is not already in the cache, then the training results are stored in the cache for future reuse).

Each time a request to perform a batch processing of the training data 422 is requested of the vGPUs 470 via the GPU driver 420 and/or the vGPU manager 460, a key is generated. In one or more embodiments, a unique key used to identify a unit of processing is defined. In some exemplary implementations, the disclosed machine learning model training parameter caching techniques use a combination of one or more of the following data elements to generate the unique key:
  hash of training data 422;
  hash of model design 424 architecture definition; and/or
  key value pairs of model tuning hyperparameters 426.

In some embodiments, the contents of the machine learning model cache 150 comprise a result value associated with the unique key, comprising one or more of the following training parameters:
  trained model (e.g., model parameters);
  epoch level checkpoints; and
  simulated response time (e.g., how long each epoch took for training).

Figure 5:
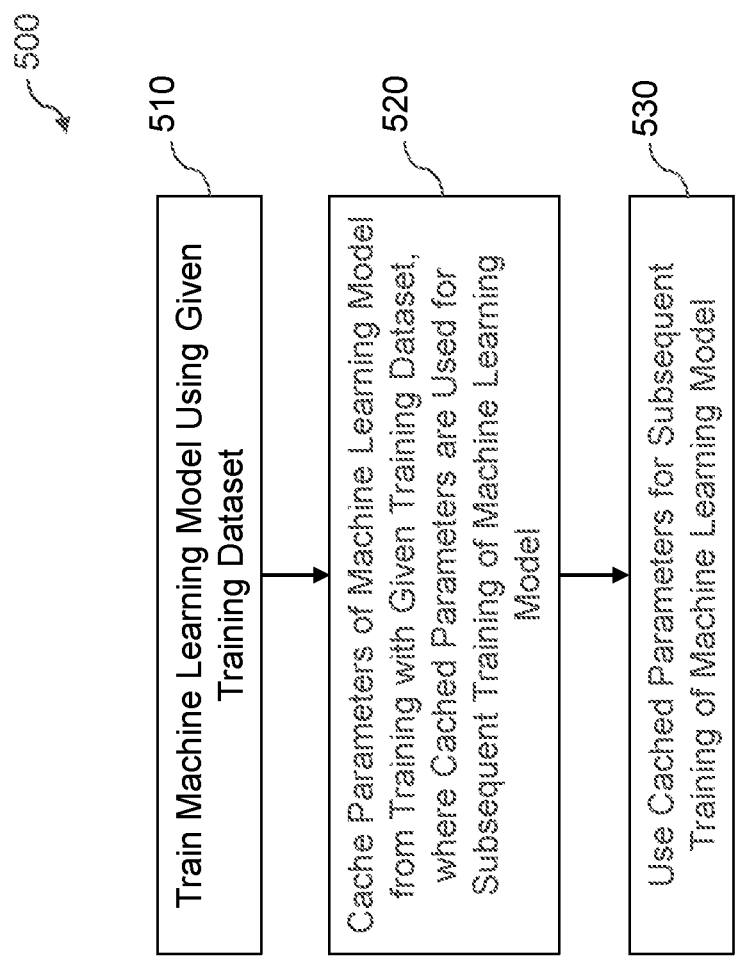
FIG. 5 is a flow chart illustrating an exemplary implementation of a machine learning model training parameter caching process, according to an embodiment of the disclosure.

FIG. 5 is a flow chart illustrating an exemplary implementation of a machine learning model training parameter caching process 500, according to an embodiment of the disclosure. As shown in FIG. 5, the exemplary implementation of a machine learning model training parameter caching process 500 initially trains a machine learning model during step 510, using a given training dataset.

During step 520, at least one parameter of the machine learning model from the training with the given training dataset is cached, and then the cached at least one parameter of the machine learning model is used during step 530 for a subsequent training of the machine learning model (for example, with the given training dataset). The caching of step 520 is performed, for example, after each of a plurality of iterations of the training of the machine learning model.

Figure 6:
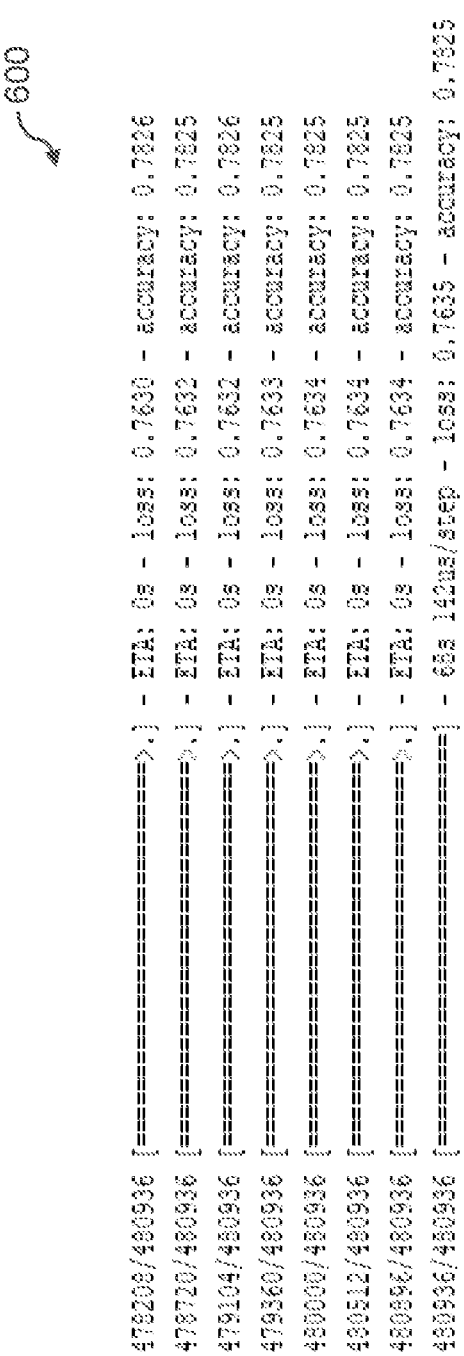
FIG. 6 illustrates an exemplary training output from one or more GPUs of FIG. 4, according to one exemplary embodiment.

FIG. 6 illustrates an exemplary training output 600 from one or more GPUs 470 of FIG. 4, according to one exemplary embodiment. The first column of the training output 600 indicates the batch number of the epoch, and the second column of the training output 600 indicates the total number of batches, followed by a progress bar. In the example of FIG. 6, the first row indicating "478208/480936" represents that the training data was broken into 480936 batches that make up one epoch of training, and 478208 represents the current batch step.

In addition, the exemplary training output 600 also indicates the amount of time that it took each batch to execute (ETA), as well as loss (how well machine learning model performs) and accuracy (by running test data and comparing to model) values. At the end of an epoch, the exemplary training output 600 indicates the sum of all times, as well as summary data across the training data. "68s" in the final row thus represents the total runtime of an epoch, which is based on 142 us per batch step.

In the example of FIG. 6, the data science training code is substantially unaffected by the disclosed machine learning model training parameter caching techniques, as the machine learning model cache 150 is accessed via the GPU driver 420 in some embodiments. The computation task to train the approximately 4.8 million parameters is only performed once and cached and can be reused by other requests to do the same task.

It has been found that the effort to train these 4.8 million parameters is significant, as each execution typically performs many epochs (training passes) during each execution.

Among other benefits, in some embodiments, the disclosed machine learning model training parameter caching techniques allow an education provider to employ an artificial intelligence training platform at low cost to education, thereby creating a marketing advantage, and also creating Carbon aware solutions by reducing GPU usage and improving cloud economics.

Techniques are provided in one or more embodiments for caching of one or more machine learning model training parameters, so that they can be reused for a subsequent training of the machine learning model. In some embodiments, the caching is performed after each iteration of the machine learning model training.

One or more embodiments of the disclosure provide improved methods, apparatus and computer program products for caching of machine learning model training parameters. The foregoing applications and associated embodiments should be considered as illustrative only, and numerous other embodiments can be configured using the techniques disclosed herein, in a wide variety of different applications.

It should also be understood that the disclosed machine learning model training parameter caching techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for caching of machine learning model training parameters may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform-as-a-Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based machine learning model training parameter caching engine, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based machine learning model training parameter caching platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 7 and 8. These platforms may also be used to implement at least portions of other information processing systems in other embodiments.

Figure 7:
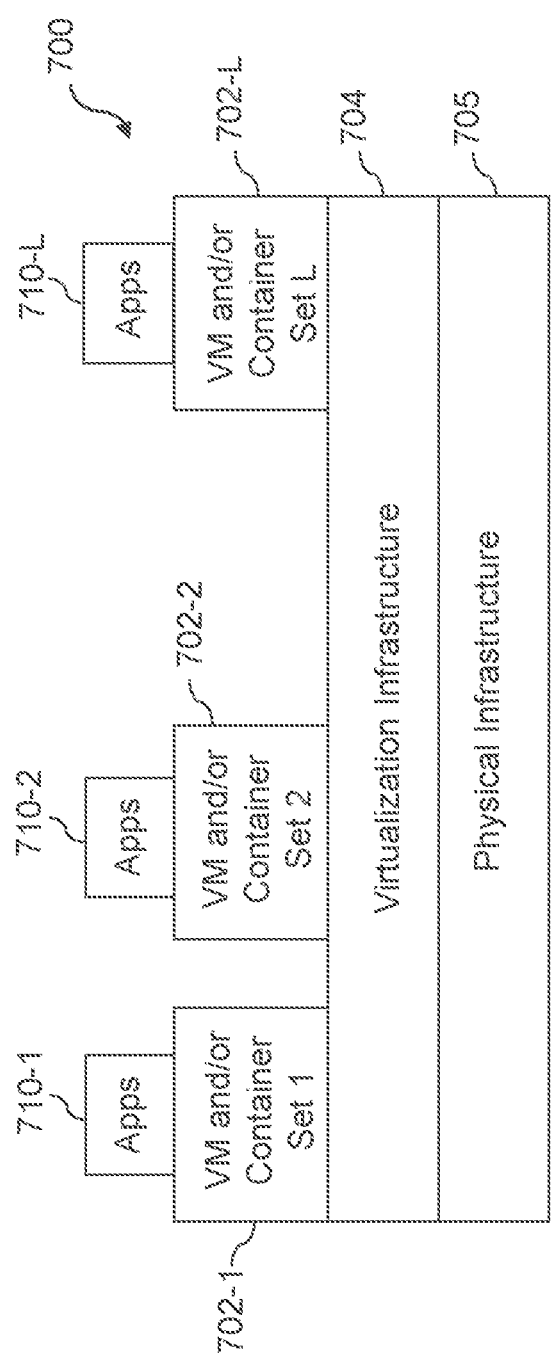
FIG. 7 illustrates an exemplary processing platform that may be used to implement at least a portion of one or more embodiments of the disclosure comprising a cloud infrastructure.

FIG. 7 shows an example processing platform comprising cloud infrastructure 700. The cloud infrastructure 700 comprises a combination of physical and virtual processing resources that may be utilized to implement at least a portion of an information processing system. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 may comprise respective VMs, respective sets of one or more containers, or respective sets of one or more containers running in VMs.

In some implementations of the FIG. 7 embodiment, the VMs/container sets 702 comprise respective VMs implemented using virtualization infrastructure 704 that comprises at least one hypervisor. Such implementations can provide machine learning model training parameter caching functionality of the type described above for one or more processes running on a given one of the VMs. For example, each of the VMs can implement machine learning model training parameter caching control logic and associated checkpoint retrieval techniques for providing machine learning model training parameter caching functionality for one or more processes running on that particular VM.

An example of a hypervisor platform that may be used to implement a hypervisor within the virtualization infrastructure 704 is the VMware® vSphere® which may have an associated virtual infrastructure management system such as the VMware® vCenter™. The underlying physical machines may comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system. Such implementations can provide machine learning model training parameter caching functionality of the type described above for one or more processes running on different ones of the containers. For example, a container host device supporting multiple containers of one or more container sets can implement one or more instances of machine learning model training parameter caching control logic and associated checkpoint retrieval for use in machine learning model training parameter caching.

As is apparent from the above, one or more of the processing modules or other components of the exemplary DNN processing environment 400 of FIG. 4, for example, may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises at least a portion of the given system and includes a plurality of processing devices, denoted 802-1, 802-2, 802-3, . . . 802-K, which communicate with one another over a network 804. The network 804 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 802-1 in the processing platform 800 comprises a processor 810 coupled to a memory 812. The processor 810 may comprise a microprocessor, a microcontroller, an application specific integrated circuit (ASIC), a field programmable gate array (FPGA) or other type of processing circuitry, as well as portions or combinations of such circuitry elements, and the memory 812, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and the given system may include additional or alternative processing platforms, as well as numerous distinct processing platforms in any combination, with each such platform comprising one or more computers, storage devices or other processing devices.

Figure 8:
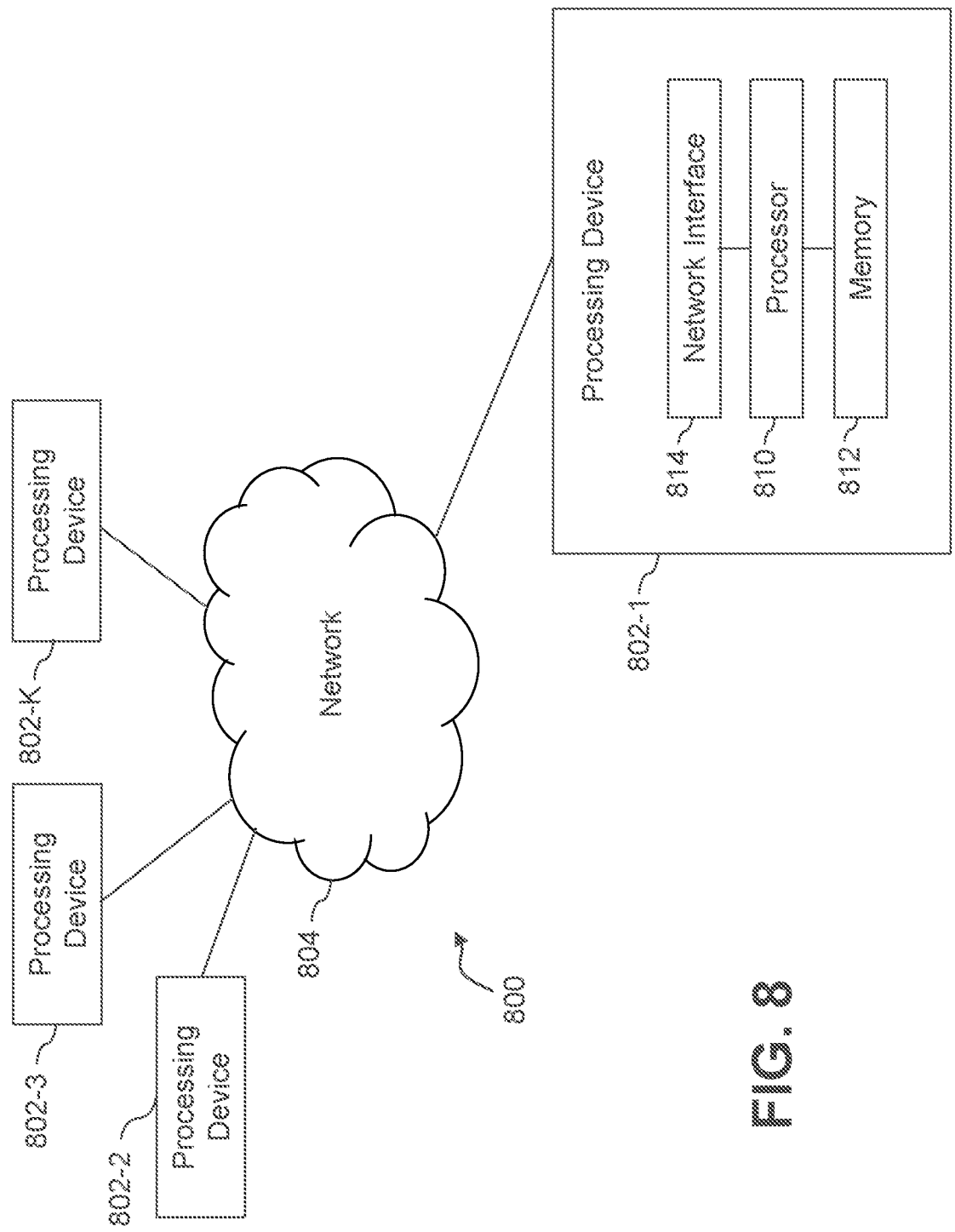
FIG. 8 illustrates another exemplary processing platform that may be used to implement at least a portion of one or more embodiments of the disclosure.

Multiple elements of an information processing system may be collectively implemented on a common processing platform of the type shown in FIG. 7 or 8, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:

training, by a first training process, a machine learning model using a given training dataset comprising a plurality of input training data elements and respective ones of a plurality of output labels, wherein the training learns one or more parameters of the machine learning model, using the given training dataset to learn to recognize a given output label of the plurality of output labels for a given input training data element, wherein the one or more learned parameters of the machine learning model comprise one or more weights for respective connections between a plurality of layers of the machine learning model, and wherein the trained machine learning model generates one or more of: (i) at least one prediction and (ii) at least one classification, wherein the one or more learned parameters of the machine learning model are distinct from the plurality of input training data elements and from the plurality of output labels; and caching, in at least one cache memory, at least one of the one or more learned parameters of the machine learning model from the training with the given training dataset, wherein the cached at least one learned parameter of the machine learning model is reused for a subsequent training, by a subsequent training process, wherein the subsequent training process is distinct from the first training process, wherein the cached at least one learned parameter of the machine learning model is provided, in response to a request by the subsequent training process, to the subsequent training process by a processor-based cache manager that manages the at least one cache memory for a plurality of training processes;

wherein the method is performed by at least one processing device comprising a processor coupled to a memory.

2. The method of claim 1, wherein the caching is performed after each of a plurality of iterations of the training of the machine learning model.

3. The method of claim 2, wherein a given cached iteration of the training of the machine learning model is identified using a key based at least in part on one or more of: (i) a hash of the given training dataset, (ii) a hash of the at least one learned parameter of the machine learning model following the given cached iteration, and (iii) one or more hyperparameters of the machine learning model following the given cached iteration.

4. The method of claim 3, wherein the key for the given cached iteration of the training of the machine learning model is evaluated to determine if the given cached iteration is in the at least one cache memory.

5. The method of claim 2, wherein a given cached iteration of the training of the machine learning model comprises the trained machine learning model following the given cached iteration, checkpoints of the given cached iteration, and a response time of the given cached iteration.

6. The method of claim 2, wherein the caching of a given iteration of the training of the machine learning model occurs when the given cached iteration is not found in the at least one cache memory.

7. The method of claim 6, wherein the at least one cache memory is accessible by one or more of: (a) one or more physical processing devices, and (b) one or more virtual processing devices that implement the training of the machine learning model.

8. An apparatus comprising:
  at least one processing device comprising a processor coupled to a memory;
  the at least one processing device being configured to implement the following steps:
  training, by a first training process, a machine learning model using a given training dataset comprising a plurality of input training data elements and respective ones of a plurality of output labels, wherein the training learns one or more parameters of the machine learning model, using the given training dataset to learn to recognize a given output label of the plurality of output labels for a given input training data element, wherein the one or more learned parameters of the machine learning model comprise one or more weights for respective connections between a plurality of layers of the machine learning model, and wherein the trained machine learning model generates one or more of: (i) at least one prediction and (ii) at least one classification, wherein the one or more learned parameters of the machine learning model are distinct from the plurality of input training data elements and from the plurality of output labels; and
  caching, in at least one cache memory, at least one of the one or more learned parameters of the machine learning model from the training with the given training dataset, wherein the cached at least one learned parameter of the machine learning model is reused for a subsequent training, by a subsequent training process, wherein the subsequent training process is distinct from the first training process, wherein the cached at least one learned parameter of the machine learning model is provided, in response to a request by the subsequent training process, to the subsequent training process by a processor-based cache manager that manages the at least one cache memory for a plurality of training processes.

9. The apparatus of claim 8, wherein the caching is performed after each of a plurality of iterations of the training of the machine learning model.

10. The apparatus of claim 9, wherein a given cached iteration of the training of the machine learning model is identified using a key based at least in part on one or more of: (i) a hash of the given training dataset, (ii) a hash of the at least one learned parameter of the machine learning model following the given cached iteration, and (iii) one or more hyperparameters of the machine learning model following the given cached iteration.

11. The apparatus of claim 10, wherein the key for the given cached iteration of the training of the machine learning model is evaluated to determine if the given cached iteration is in the at least one cache memory.

12. The apparatus of claim 9, wherein a given cached iteration of the training of the machine learning model comprises the trained machine learning model following the given cached iteration, checkpoints of the given cached iteration, and a response time of the given cached iteration.

13. The apparatus of claim 9, wherein the caching of a given iteration of the training of the machine learning model occurs when the given cached iteration is not found in the at least one cache memory.

14. The apparatus of claim 13, wherein the at least one cache memory is accessible by one or more of: (a) one or more physical processing devices, and (b) one or more virtual processing devices that implement the training of the machine learning model.

15. A non-transitory processor-readable storage medium having stored therein program code of one or more software programs, wherein the program code when executed by at least one processing device causes the at least one processing device to perform the following steps:
  training, by a first training process, a machine learning model using a given training dataset comprising a plurality of input training data elements and respective ones of a plurality of output labels, wherein the training learns one or more parameters of the machine learning model, using the given training dataset to learn to recognize a given output label of the plurality of output labels for a given input training data element, wherein the one or more learned parameters of the machine learning model comprise one or more weights for respective connections between a plurality of layers of the machine learning model, and wherein the trained machine learning model generates one or more of: (i) at least one prediction and (ii) at least one classification, wherein the one or more learned parameters of the machine learning model are distinct from the plurality of input training data elements and from the plurality of output labels; and
  caching, in at least one cache memory, at least one of the one or more learned parameters of the machine learning model from the training with the given training dataset, wherein the cached at least one learned parameter of the machine learning model is reused for a subsequent training, by a subsequent training process, wherein the subsequent training process is distinct from the first training process, wherein the cached at least one learned parameter of the machine learning model is provided, in response to a request by the subsequent training process, to the subsequent training process by a processor-based cache manager that manages the at least one cache memory for a plurality of training processes.

16. The non-transitory processor-readable storage medium of claim 15, wherein the caching is performed after each of a plurality of iterations of the training of the machine learning model.

17. The non-transitory processor-readable storage medium of claim 16, wherein a given cached iteration of the training of the machine learning model is identified using a key based at least in part on one or more of: (i) a hash of the given training dataset, (ii) a hash of the at least one learned parameter of the machine learning model following the given cached iteration, and (iii) one or more hyperparameters of the machine learning model following the given cached iteration.

18. The non-transitory processor-readable storage medium of claim 17, wherein the key for the given cached iteration of the training of the machine learning model is evaluated to determine if the given cached iteration is in the at least one cache memory.

19. The non-transitory processor-readable storage medium of claim 16,
wherein a given cached iteration of the training of the machine learning model comprises the trained machine learning model following the given cached iteration, checkpoints of the given cached iteration, and a response time of the given cached iteration.

20. The non-transitory processor-readable storage medium of claim 16, wherein the caching of a given iteration of the training of the machine learning model occurs when the given cached iteration is not found in the at least one cache memory.

* * * * *